(12) United States Patent
Powell et al.

(10) Patent No.: US 12,710,974 B2
(45) Date of Patent: Aug. 18, 2026

(54) SECURE MAPPING OF PROCESS ADDRESS SPACE IDENTIFIERS FOR COMPUTING ENVIRONMENTS IMPLEMENTING INPUT/OUTPUT VIRTUALIZATION

(71) Applicant: ADVANCED MICRO DEVICES, INC., Santa Clara, CA (US)

(72) Inventors: Jeremy W. Powell, Austin, TX (US); David Kaplan, Austin, TX (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 503 days.

(21) Appl. No.: 18/122,505

(22) Filed: Mar. 16, 2023

(65) Prior Publication Data

US 2024/0311167 A1 Sep. 19, 2024

(51) Int. Cl.
*G06F 9/455* (2018.01)

(52) U.S. Cl.
CPC .................... *G06F 9/45558* (2013.01); *G06F 2009/45579* (2013.01); *G06F 2009/45587* (2013.01)

(58) Field of Classification Search
CPC ....... G06F 9/45558; G06F 2009/45579; G06F 2009/45587
See application file for complete search history.

(56) References Cited

U.S. PATENT DOCUMENTS

| | | | | |
|---|---|---|---|---|
| 2011/0022818 | A1* | 1/2011 | Kegel | G06F 12/1081 718/1 |
| 2019/0266091 | A1* | 8/2019 | Robinson | G06F 13/1673 |
| 2021/0026543 | A1 | 1/2021 | Trikalinou et al. | |
| 2021/0064525 | A1* | 3/2021 | Tian | G06F 12/1081 |
| 2021/0089466 | A1* | 3/2021 | Shanbhogue | G06F 9/45558 |
| 2021/0173790 | A1 | 6/2021 | Kakaiya et al. | |
| 2021/0271481 | A1* | 9/2021 | Tian | G06F 9/45558 |
| 2023/0032586 | A1* | 2/2023 | Ranganathan | G06F 12/1483 |
| 2025/0168018 | A1* | 5/2025 | Sahita | H04L 63/0823 |

OTHER PUBLICATIONS

Intel Corp., "Scalable I/O Virtualization: Technical Specification," Sep. 2020, 29 pages.
AMD Corp., "AMD SEV-SNP: Strengthening VM Isolation with Integrity Protection and More," Jan. 2020, 20 pages.
International Search Report and Written Opinion for Application No. PCT/US2024/019595, mailed Jul. 8, 2024, 11 pages.
International Preliminary Report on Patentability mailed Sep. 25, 2025 for PCT/US2024/019595, 8 pages.

* cited by examiner

*Primary Examiner* — Edward J Dudek, Jr.

(57) ABSTRACT

A processor includes a virtual machine manager (VMM) configured to map a guest process address space identifier (PASID) associated with a virtual machine (VM) to a host PASID associated with a host machine of the VM. The processor further includes a processor core configured to maintain, responsive to the guest PASID being mapped to the host PASID, an entry in a PASID reverse mapping table (PMP) including one or more security attributes associated with the host PASID.

20 Claims, 9 Drawing Sheets

SECURE MAPPING OF PROCESS ADDRESS SPACE IDENTIFIERS FOR COMPUTING ENVIRONMENTS IMPLEMENTING INPUT/OUTPUT VIRTUALIZATION

BACKGROUND

Processing systems (e.g., servers) often employ virtualized execution environments to combine and scale physical and logical resources of the processing system. For example, processing systems execute virtual machines (guests), which are software entities that emulate or otherwise interface with the hardware of the processing systems to provide support for executing software programs. A virtual machine can use hardware elements (e.g., processors, memories, network interfaces, etc.) in a processing system to provide support for running one or more instances of operating systems, referred to as guest operating systems. The guest operating systems in turn provide support for executing other software programs, such as applications and databases. A virtual machine manager or monitor (e.g., a hypervisor) controls the scheduling of the different virtual machines for execution and provides an interface between the virtual machines and the server hardware, so that each VM is able to operate as if that VM were executing on its own dedicated hardware. In another example, processing systems virtualize one or more of their input/output devices, such as controllers (e.g., bus, interconnect, and/or fabric controllers, network interface controllers, etc.), processors/accelerators (e.g., graphics processors, cryptographic accelerators, compression accelerators), and any other resources that can be addressed in the processing systems. Virtualization of an input/output device allows the physical device to appear as multiple physical devices to host machine or virtual machine.

BRIEF DESCRIPTION OF THE DRAWINGS

The present disclosure may be better understood, and its numerous features and advantages are made apparent to those skilled in the art by referencing the accompanying drawings. The use of the same reference symbols in different drawings indicates similar or identical items.

DETAILED DESCRIPTION

Figure 1:
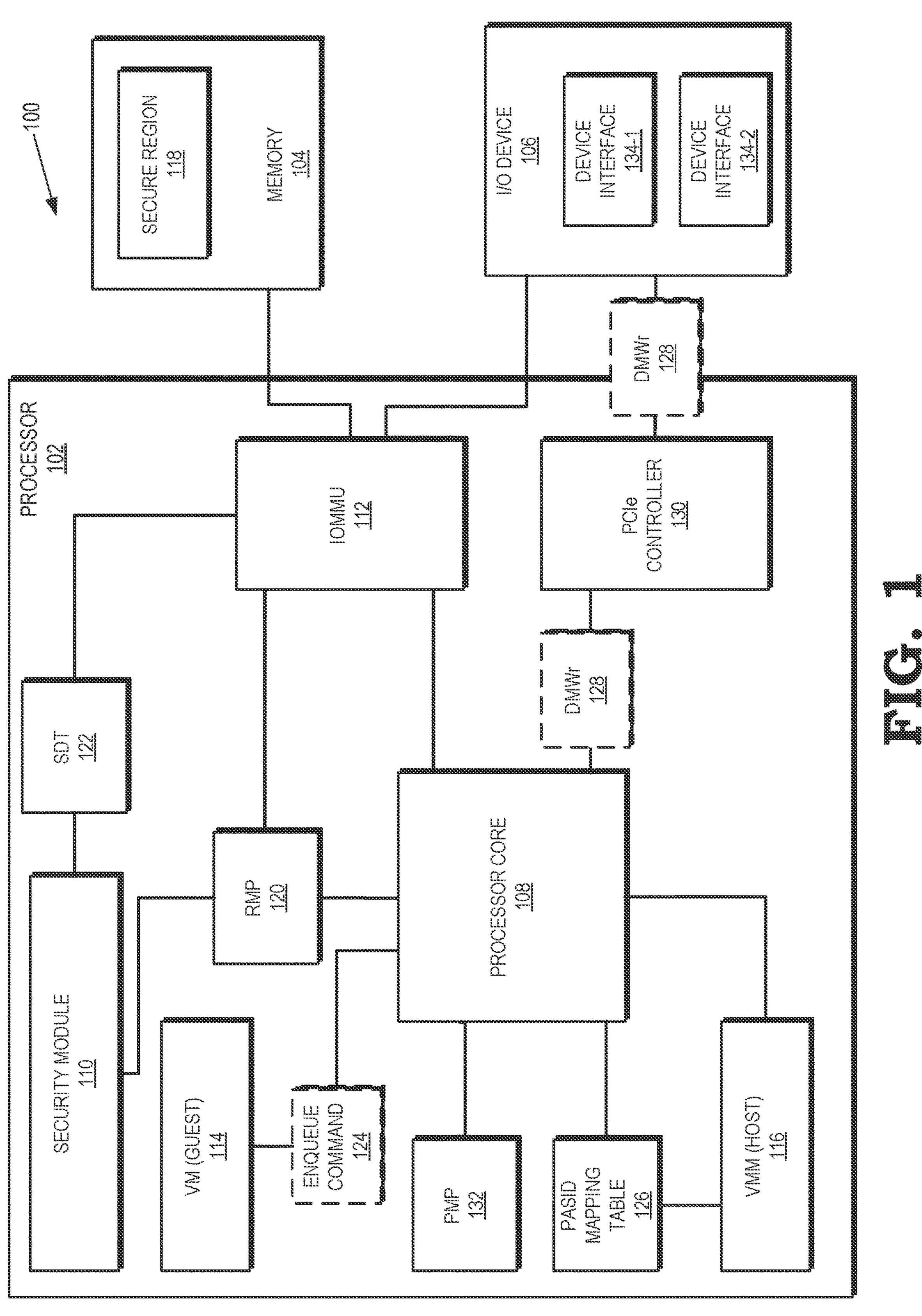
FIG. 1 is a block diagram of a processing system that employs secure mapping of process address space identifiers (PASIDs) for virtualized computing/execution environments in accordance with some implementations.

Various techniques can be implemented by a processing system for virtualizing input/output (I/O) devices. One example, of an I/O virtualization technique is single-root I/O virtualization (SR-IOV), which enables multiple virtual machines (also referred to herein as guests or VMs) to share Peripheral Component Interconnect Express (PCIe) hardware resources under a single-node system (e.g., single root complex). For example, an SR-IOV device allows a physical device, such as a network interface controller (NIC), to appear as multiple NICs to a VM or host machine. Accordingly, multiple VMs at a host machine are able to share a single PCIe device. In an SR-IOV environment, the hypervisor (also referred to as a virtual machine manager or monitor (VMM)) maps one or more logical interfaces (i.e., virtual functions) to a VM, where each logical interface appears as a single input/output device to the host operating system (OS). However, the number of virtualized instances (e.g., virtual functions) of a given hardware type, such as an NIC or bus, is limited. For example, an NIC is limited by hardware constraints with respect to the number of virtual functions that it can support. As such, SR-IOV limits the number of virtual functions for an input/output device, which also limits the number of VMs that can utilize the virtual functions.

Scalable I/O Virtualization (SIOV) attempts to overcome the scalability and other issues associated with SR-IOV. SIOV is a PCIe-based virtualization technique that provides for scalable sharing across virtualized execution environments of I/O devices. Unlike the coarse-grained device partitioning approach of SR-IOV to create multiple virtual functions on device, SIOV enables software to flexibly compose virtual devices utilizing the hardware-assists for device sharing at finer granularity. Performance critical operations on the composed virtual device are mapped directly to the underlying device hardware, while non-critical operations are emulated through device-specific composition software in the host.

SIOV scales device interactions by implementing shared work queues (SWQs) and a type of memory access over PCIe referred to as deferrable memory writes. For example, an SIOV capable device is configured to group its resources into multiple isolated assignable device interfaces (ADIs), which form the unit of assignment and isolation for devices to form virtual devices. ADIs are associated with SWQs for work submission, which are interfaces that can be used simultaneously by different VMs. Stated differently, an SWQ allows multiple VMs to submit work requests to the same ADI. A process of a VM submits work requests to an SWQ using deferrable memory writes (DMWrs). A DMWr is a write that can temporarily fail due to unavailability of the underlying resource. Such a failure indicates that the process should re-attempt access to the SWQ. When a process within a VM writes to the registers of an SWQ for submitting work requests/descriptors to the ADI, the process uses an instruction to create a DMWr to that register. That is, the instruction used by the process atomically submits a work descriptor to the SWQ. More generally, the instruction is an "enqueue command" for writing commands to "enqueue registers", which are special device registers accessed using memory-mapped I/O (MMIO). Examples of this instruction include Enqueue Command (ENQCMD) and Enqueue Command Supervisor (ENQCMDS).

In SIOV, clients of an ADI are identified using a process address space identifier (PASID), which is a unique identifier that isolates the process address space used by a guest (VM) OS and links the clients' accesses to their views of and access rights to memory. A PASID is used to distinguish upstream memory transactions performed for different ADIs and to convey the address space targeted by the transaction. This is in contrast with SR-IOV where a client (e.g., processes of a VM) interacts with an SR-IOV interface using an interface-specific MMIO address. In a non-virtualized environment, the OS manages the assignment of PASIDs to processes using, for example, a model specific register (MSR). This MSR allows an application address space to be associated with a PASID. The OS sets the MSR to the appropriate PASID when the scheduler context switches into the process. Then, an instruction, such as ENQCMD, uses the MSR to attach the PASID to the DMWr request to the work queue of the input/output device. However, in virtualized systems, the guest OS assigns multiple PASIDs to its processes. Therefore, the VMM virtualizes the PASID associated with a VM. That is, the VMM transparently maps the PASIDs assigned by the guest OS to real PASIDs to give the guest OS the view that it owns the entire PASID space. As part of this PASID mapping process, the VMM uses a memory data structure to point to a mapping table that maps a guest PASID to a host PASID. Therefore, when a guest process invokes an enqueue command, the PASID written by the VM process is translated automatically by the processor into a host PASID and written to the SWQ via a DMWr.

Although SIOV allows many different VMs to access a single input/output device resource without the constraints imposed by SR-IOV, SIOV is generally not designed with security or confidential computing as a priority, which can make implementing SIOV in confidential computing environments challenging. For example, the mapping from a guest PASID to a host PASID and from a host PASID to a guest context within an I/O device is trusted to the VMM in SIOV. However, the VMM is typically not considered a trusted device in a confidential computing environment because the VMM can act maliciously or introduce security risks into the environment. For example, the VMM can maliciously execute a DMWr with the PASID of a VM and gain access to an isolation domain in the SIOV environment.

Accordingly, the present disclosure describes implementations of systems and methods for securely managing PASID mapping in a confidential computing environment implementing input/output virtualization, such as SIOV or equivalent, in accordance with some implementations. As described in greater detail below, one or more techniques are implemented that allow a VMM to indirectly allocate PASIDs for a VM while not allowing the VMM arbitrary authority to change the mapping. For example, in at least some implementations, the VMM is configured to allocate a table, such as a PASID reverse map table (PMP), global to the system that is indexed by a Host PASID. When a VM process invokes an enqueue command for submitting a work request to a device interface (e.g., ADI) via an SWQ, the processor translates the guest PASID into a host PASID using one or more translation techniques. Then, the processor indexes the PMP table with the resulting host PASID. If the PMP entry associated with the host PASID includes the guest PASID and the identifier of the accessing VM process, the processor determines that the access is valid and the enqueue command proceeds. Otherwise, the processor determines that the VMM has changed the PASID mapping and enqueue command fails. For example, the processor issues an error message to one or both of the VMM or VM, which prevents the enqueue command from being processed. As such, the techniques described herein provide for the secure management of PASID mapping by a VMM and protects VMs against malicious PASID modifications.

FIG. 1 illustrates a processing system 100 that implements secure mapping of PASIDs for virtualized computing/execution environments in accordance with some inventions. It should be understood that although one or more techniques presented herein are described with respect to scalable input/output virtualization, these techniques are applicable to any virtualization architecture, framework, or specification that implements PASID mapping for virtualized resources.

The processing system 100 is generally configured to execute sets of instructions (e.g., computer programs) to carry out tasks on behalf of an electronic device. Accordingly, the processing system 100 is part of various electronic devices in different implementations. For purposes of description, it is assumed that the processing system 100 is part of an electronic device that implements a confidential computing environment, such as a server. However, in other implementations, the processing system 100 is part of a desktop computer, laptop computer, tablet, game console, and the like.

To implement the confidential computing environment and to execute the sets of instructions and corresponding operations, the processing system 100 includes a processor 102, a memory 104, and one or more input/output (I/O) devices, such as I/O device 106. In some implementations, the processor 102 is a general-purpose processor, such as a central processing unit (CPU), including hardware structures configured to retrieve and execute the sets of instructions. The memory 104 includes one or more memory devices configured to store and retrieve data based on commands (e.g., store and load commands) received from the processor 102. Accordingly, in different implementations, the memory 104 is random access memory (RAM), non-volatile memory (NVM), hard disc memory, and the like, or any combination thereof.

The I/O device 106 is any device that can, independent of the processor 102, process input information, output information, or a combination thereof on behalf of the processing system 100. For example, in some implementations, the I/O device 106 is a network interface device that processes input and output information for a network (not shown) connected to the processing system 100. In other implementations, the I/O device 106 is a storage controller (e.g., a disc controller or non-volatile memory (NVM) storage controller), a controller associated with a user interface (e.g., a keyboard), and the like.

To execute the sets of instructions and corresponding operations, the processor 102 includes a processor core 108, a security module 110, and an input/output memory management unit (IOMMU) 112. It will be appreciated that, in some implementations, the processor 102 includes additional hardware to execute instructions and to execute operations based on those instructions, such as additional processor cores, additional processing units (e.g., one or more graphics processing units), one or more controllers (e.g., memory controllers and input/output controllers), and the like.

The processor core 108 includes one or more instruction pipelines, including a plurality of stages to execute instructions in a pipelined fashion. Thus, for example, in some implementations, an instruction pipeline of the processor core 108 includes a fetch stage, a decode stage, a dispatch stage, one or more execution stages (with one or more corresponding execution units), a retire stage, and the like. The processor core 108 also includes, or has access to, memory structures and other hardware (not explicitly illustrated in FIG. 1) that support the execution of instructions. For example, in some implementations, the processor core 108 includes or has access to one or more cache structures to store data used to execute the instructions.

The security module 110 is a set of hardware structures generally configured to create, monitor, and maintain a secure environment for the processor 102. For example, in at least some implementations, the security module 110 is configured to manage the boot process for the processor 102, initialize security-related mechanisms for the processor 102, and monitor the processing system 100 for suspicious activity or events and implement an appropriate response. In some implementations, the security module 110 includes a microcontroller, a cryptographic coprocessor (CCP) to encrypt and decrypt data, local memory, and local registers to store, for example, cryptographic keys, and includes interfaces to interact with the memory 104, the I/O controller of the processor 102, and configuration registers of the processor 102. In some implementations, the security module 110 includes Environment Management Control hardware that performs environmental and security checks to ensure that the processor 102 operates according to specified security parameters.

In some implementations, the security module 110 manages a device binding process, wherein an I/O device 106 is bound to a VM (guest) 114 by undergoing a specified security registration process. For example, in some implementations, the VM 114 seeks to bind the I/O device 106 by sending a binding request to the security module 110. In response, the security module 110 initiates the specified security registration process, such as by requesting authentication information (e.g., a device certificate) from the I/O device 106 and verifying the authentication information (e.g., by comparing the authentication information or key information generated based on the authentication information, to one or more security keys). If the authentication information received from the I/O device 106 is verified, the security module 110 indicates to the VM 114 and other components of the processor 102, as described further herein, that the I/O device 106 is bound to the VM 114.

As noted above, the processing system 100 is generally configured to implement a confidential computing environment and, in particular, to execute a plurality of VMs 114, also referred to as guests, and a VMM (hypervisor) 116, also referred to as a host, to manage the execution of the plurality of VMs 114. Because the different VMs 114, and at least in some cases the VMM 116, are owned by different entities, the processing system 100 implements security features to protect the data of a given VM 114 from access by other software, such as by another VM 114 or by the VMM 116. For example, the processing system 100 implements data security for the VMs 114 by implementing a secure region 118 of the memory 104 that stores encrypted data. In particular, the processor 102 is configured to encrypt specified data for each VM 114 according to a corresponding private cryptographic key and to store the encrypted data at the secure region 118. Because the data is encrypted, the data for one VM 114 is protected from unauthorized access by other VMs 114 and by the VMM 116. In at least some implementations, cryptographic keys for the VMs 114 are managed by the security module 110, and data encryption and decryption for the VMs 114 is executed by a dedicated hardware encryption/decryption module (not shown) at a memory controller (not shown) of the processor 102.

In at least some implementations, the confidential computing environment of the processing system 100 provides integrity guarantees by implementing a Reverse Map Table (RMP) 120. The RMP 120 is a single data structure shared across the system 100 and comprises one entry for every given memory page (e.g., 4k page) of memory that can be used by VMs 114. The RMP 120 tracks the owner for each page of memory. Pages of memory can be owned by the VMM 116, a specific VM 114, or by the security module 110. Access to memory is controlled so only the owner of that page can write it. The RMP 120, in at least some implementations, is used in conjunction with standard page tables to enforce memory restrictions and page access rights. In at least some implements, the processing system 100 also implements a Secure Device Table (SDT) 122 that encodes device interface VM bindings and security attributes. The SDT 122, in at least some implementations, is a store of the security attributes of the I/O devices 106. The IOMMU 112 examines the SDT 122 when there is traffic from or to the I/O device 106 to make a security policy decision on whether the access is allowed or not allowed.

An I/O device 106, in at least some implementations, accesses memory 104 assigned to a VM 114 by generating direct memory access (DMA) requests to read data from the memory 104, write data to the memory 104, or a combination thereof. The IOMMU 112 is configured to handle the DMA requests issued by I/O devices 106. For example, to enhance processing efficiency, the IOMMU 112 is generally configured to perform specified memory access operations on behalf of the processor 102—that is, to perform memory access operations using dedicated hardware of the IOMMU 112, and without requiring management of the memory access operations by the processor 102. In particular, the IOMMU 112 includes dedicated hardware to perform DMA operations. In some implementations, each DMA request issued by an I/O device 106 includes a descriptor indicating the virtual addresses of the data to be accessed—that is, the virtual address of the data to be read, the virtual address where data is to be written, or both. These virtual addresses indicate the region of the memory 104 that is targeted by the DMA request. The IOMMU 112 is generally configured to translate the virtual addresses indicated by a DMA request to physical addresses of the memory 104 and to interact with the memory 104 to carry out the one or more operations (read operations, write operations or a combination thereof) indicated by the DMA request.

In at least some implementations, the processor core 108 accesses an I/O device 106 by issuing MMIO requests associated with a particular executing VM 114. Each MMIO request identifies a memory address from which data is to be read, a memory address to which data is to be written, or a combination thereof. For example, in some cases, the processor core 108 programs a particular register of an I/O device 106 by issuing an MMIO request to write data to a memory address associated with the register. By using memory addresses to provide information to, or retrieve information from, an I/O device 106, the processor core 108 can interact with the I/O device 106 using a relatively simple set of access commands and by leveraging at least some hardware used to access system memory, thereby improving the overall efficiency of the processor core. To enhance processing efficiency, the IOMMU 112 assists in executing the MMIO requests, such as by performing virtual-to-physical address translations for the MMIO requests.

The confidential computing environment further implements I/O virtualization, such that the I/O devices 106 are virtualized and shared across multiple VMs 114. One example, of I/O virtualization implemented by the confidential computing environment is SIOV. In some implementations, one or more I/O devices 106 are a physical I/O virtualization-capable device implementing one or more device interfaces 134 (illustrated as device interface 134-1 and device interface 134-2). Each device interface 134 allows the I/O device 106 to be virtualized as a different virtual I/O device for each VM 114. In at least some implementations, the device interfaces 134 are assignable device interfaces (ADIs), which form the unit of assignment and isolation to form virtual devices.

After a VM 114 has been assigned to a device interface 134 by the VMM 116, a software process/thread of the VM submits work requests to the device interface 134 using one or more techniques. In one example, a process submits work requests through a shared work queue (SWQ) of the device interface 134, which are interfaces that allow multiple VMs 114 to submit work requests to the same device interface 134. In at least some implementations, a process of a VM 114 submits work requests to a device interface 134 by sending an enqueue command 124, such as ENQCMD or ENQCMDS, to the processor core 108. The enqueue command 124, in at least some implementations, is an instruction that atomically submits a work descriptor to a device interface 134. The enqueue command 124 includes, for example, virtual addresses of all parameters, virtual address of a completion record, and the PASID of the VM process that is submitting the work descriptor.

A PASID is a unique identifier that isolates the process address space used by a VM 114 and links a process's accesses to its view of and access rights to memory. A PASID is used to distinguish upstream memory transactions performed for different devices and to convey the address space targeted by the transaction. VMs 114 operate using guest PASIDs while the VMM 116 (including underlying hardware) operates using host PASIDs. In at least some implementations, the VMM 116 assigns PASIDs to a VM 114 from a global pool of available PASIDs and the VM 114 assigns multiple PASIDs to its processes. The VMM 116 virtualizes the PASIDs by maintaining a mapping of the guest PASIDs and host PASIDs in one or more data structures, such as PASID mapping tables 126. That is, the VMM 116 transparently maps the PASIDs assigned by the VM 114 to real PASIDs to give the VM 114 the view that it owns the entire PASID space.

Figure 2:
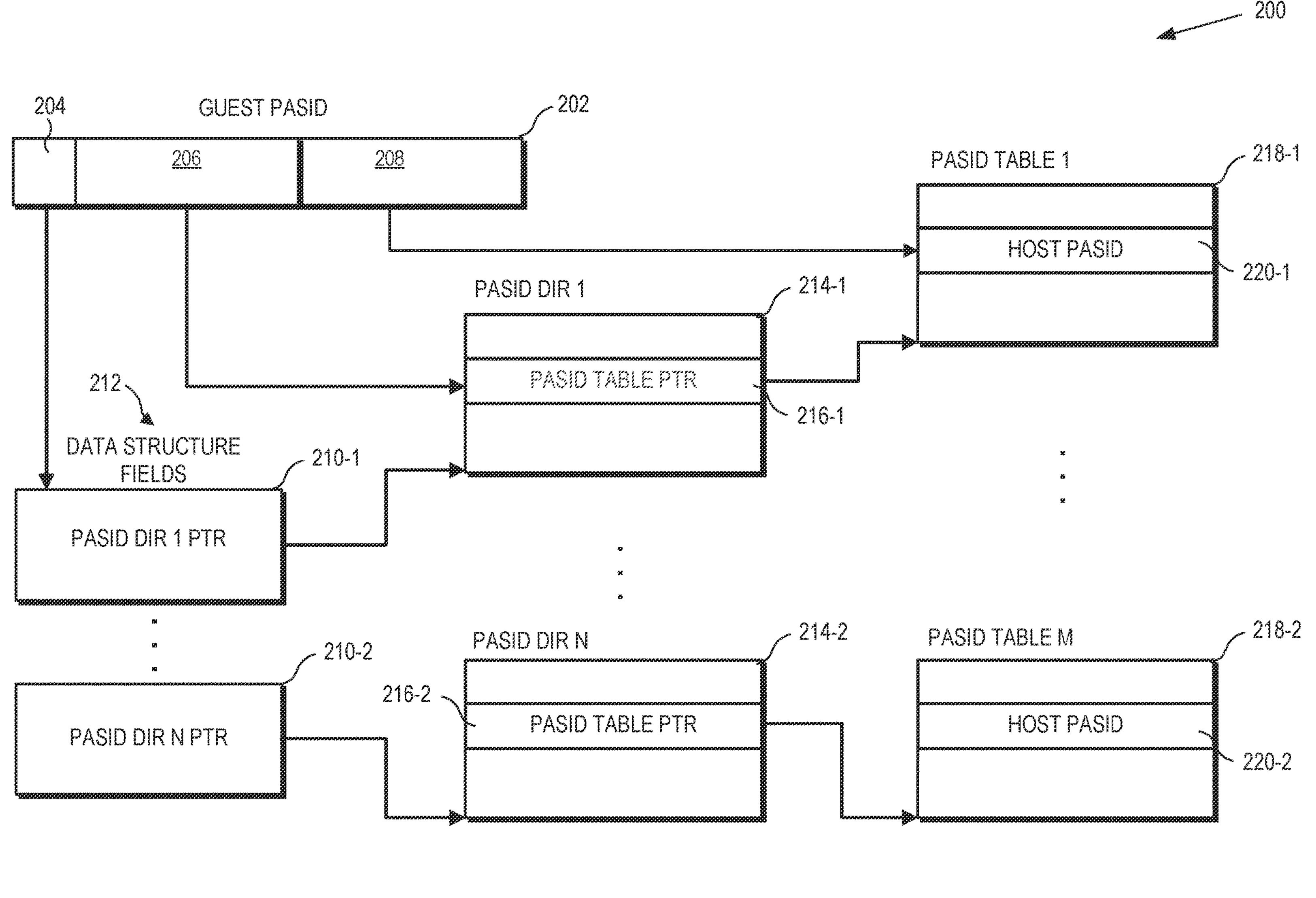
FIG. 2 illustrates one example of a PASID mapping table configuration in accordance with some implementations.

FIG. 2 shows one example of a PASID mapping table configuration 200 applicable to the techniques described herein. It should be understood that other mapping table configurations are applicable as well. In the mapping table configuration 200, a first portion 204 of the guest PASID 202 includes a PASID directory indicator. The PASID directory indicator identifies a PASID directory pointer 210 (illustrated as PASID directory pointer 1 210-1 and PASID directory pointer N 210-2) in a memory data structure 212 associated with the corresponding VM 114. The PASID directory pointer 210 points to a PASID directory 214 (illustrated as PASID directory 1 214-1 and PASID directory N 214-2). A second portion 206 of the guest PASID 202 identifies a specified entry 216 (illustrated as entry 216-1 and entry 216-2) in the PASID directory 214. The specified entry 216 points to a specified PASID table 218 (illustrated as PASID Table 1 218-1 and PASID Table M 218-2). A third portion 208 of the guest PASID 202 identifies a specified entry in the PASID table 218 comprising the corresponding host PASID 220 (illustrated as Host PASID 220-1 and Host PASID 220-2) of the guest PASID 202.

Referring again to FIG. 1, each task submitted to a device interface 134 by a process in the VM 114 is associated with a guest PASID that is translated into a corresponding host PASID. This translation task is performed by the CPU core 108 for enqueue commands 124. For example, when a VM process invokes an enqueue command 124 for submitting a work request descriptor to the device interface 134 by writing to the registers of an SWQ, the processor core 108 uses the PASID mapping table(s) 126 to automatically translate the guest PASID associated with the work request into a host PASID. The core processor 108 then uses a type of memory access over PCIe, referred to as a deferrable memory write (DMWr) 128, to place the work request into the SWQ of the device interface 134. A DMWr 128 is a write that can temporarily fail due to unavailability of the underlying resource. The DMWr 128 includes information such as the host PASID identified based on the translation process and the work request sent by the VM process. In at least some implementations, the CPU core 108 sends the DMWr 128 to the device interface 134 through a PCIe controller 130.

As described above, the VMM 116 is responsible for mapping guest PASIDs to host PASIDs and mapping host PASIDs to guest contexts within an I/O device 106. Therefore, a malicious or corrupted VMM potentially has the opportunity maliciously set/change a PASID and gain access to an isolation domain in the virtualized computing environment. As such, the processing system 100 implements one or more security mechanisms such that allow the VMM 116 to indirectly allocate PASIDs for a VM 114 while not allowing the VMM 116 arbitrary authority to change the mapping. For example, the processor core 108 maintains and secures one or more data structures, referred to herein as a PASID reverse map table (PMP) 132 that is global to the system that is indexed by the host PASID. In at least some implementations, the PMP 132 comprises one entry for each guest PASID assigned by a VM 114. The PMP 132 includes per-host PASID security attributes that are checked by the processor core 108 upon receiving an enqueue command 124 from a VM process to ensure that the VMM 116 has not unexpectedly changed the PASID mapping. In at least some embodiments, the security module 110 initializes the PMP 132.

Figure 3:
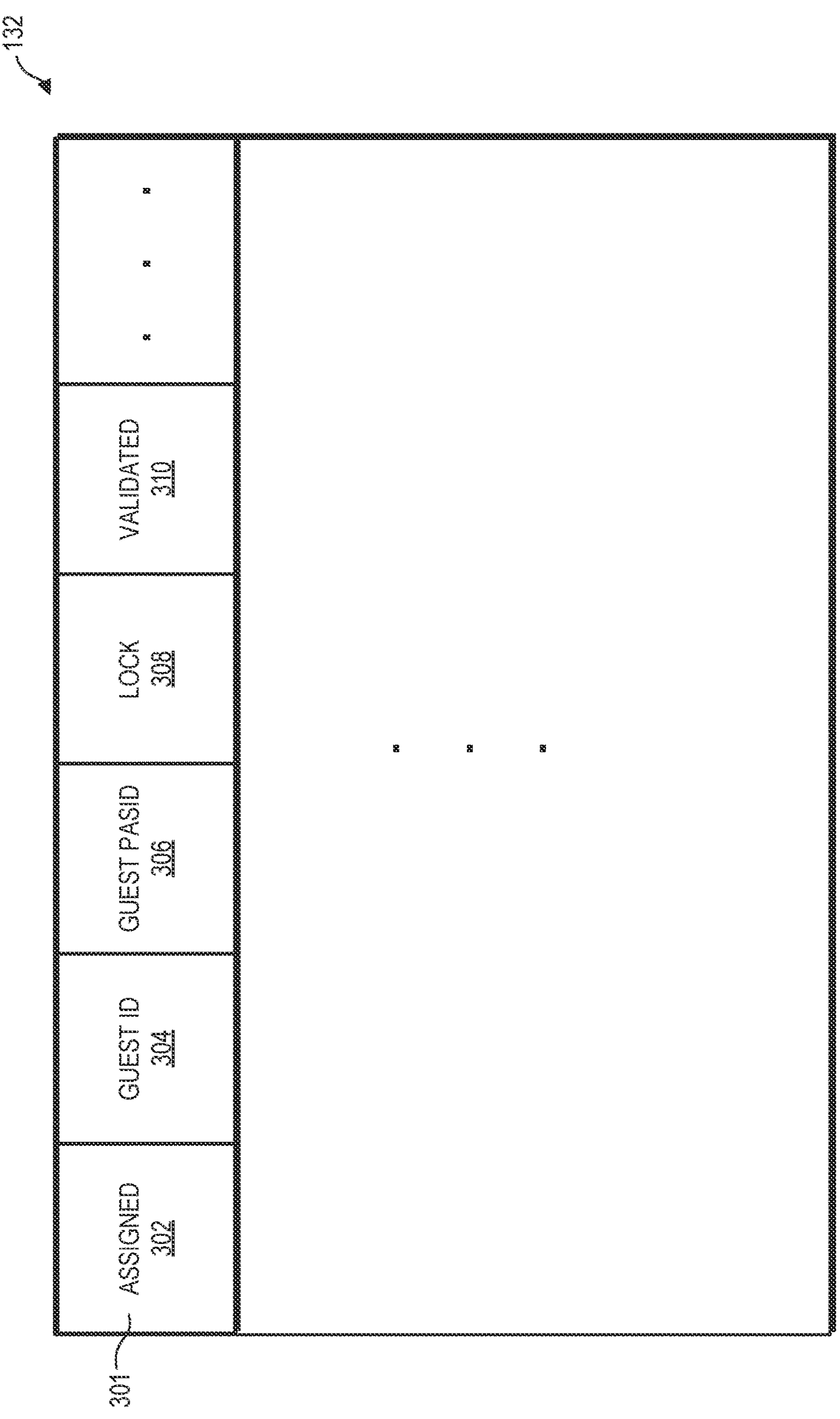
FIG. 3 illustrates one example of a PASID reverse map table (PMP) in accordance with some implementations.

FIG. 3 shows one example of the PMP 132 in accordance with some implementations. In the depicted example, the PMP 132 includes a plurality of entries 301, wherein each entry is assigned to a different host PASID. Each entry of the PMP 132 includes a plurality of fields, including an Assigned field 302, a Guest ID field 304, a Guest PASID field 306, a Lock field 308, a Validated field 310, and the like. The Assigned field 302 stores a bit (or other information) that indicates whether the host PASID associated with the PMP entry 301 has been assigned (or has not been assigned) to a VM 114. For example, if the bit is set in the Assigned field 302, this indicates the host PASID has been assigned to a VM 114. The Guest ID field 304 stores an identifier, such as an address space identifier (ASID), of the VM 114 that has been assigned to the host PASID associated with the PMP entry 301. The Guest PASID field 306 stores the guest PASID that should translate to the host PASID associated with PMP entry 301. The Lock field 308 stores a bit (or other information) that is used to coordinate multiple hardware threads of the processor core 108 when concurrently accessing the PMP 132. If there are multiple hardware threads and one is updating an entry 301 of the PMP 132 and the other threads are trying to access the same entry 301, the Lock field 308 indicates to the threads that owns the entry 301. For example, a thread will attempt to atomically set the bit of the Lock field 308 when writing to the entry 301. If the thread successfully sets the bit, the thread knows that it owns the entry and can continue accessing the entry. The thread will clear the bit after it has completed its operations. The Validated field 310 stores a bit (or other information) indicating that the VM 114 has previously validated that the host PASID associated with the entry 301 is assigned to the VM 114, as described in greater detail below.

Figure 4:
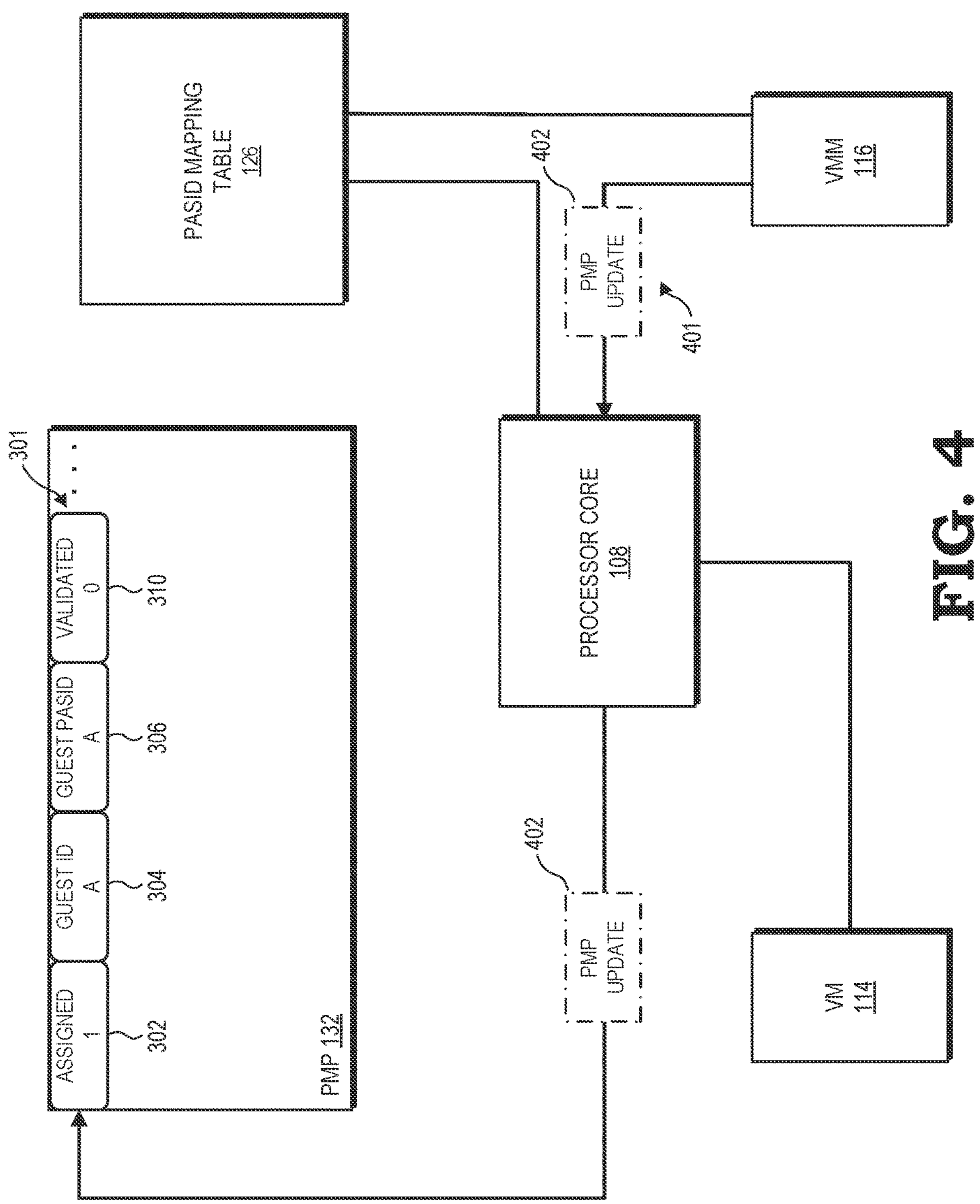
FIG. 4 is a block diagram illustrating an example of a virtual machine manager (VMM) of the processing system of FIG. 1 performing a PMP update process to add host PASID security attributes to the PMP of FIG. 3 in accordance with some implementations.
Figure 5:
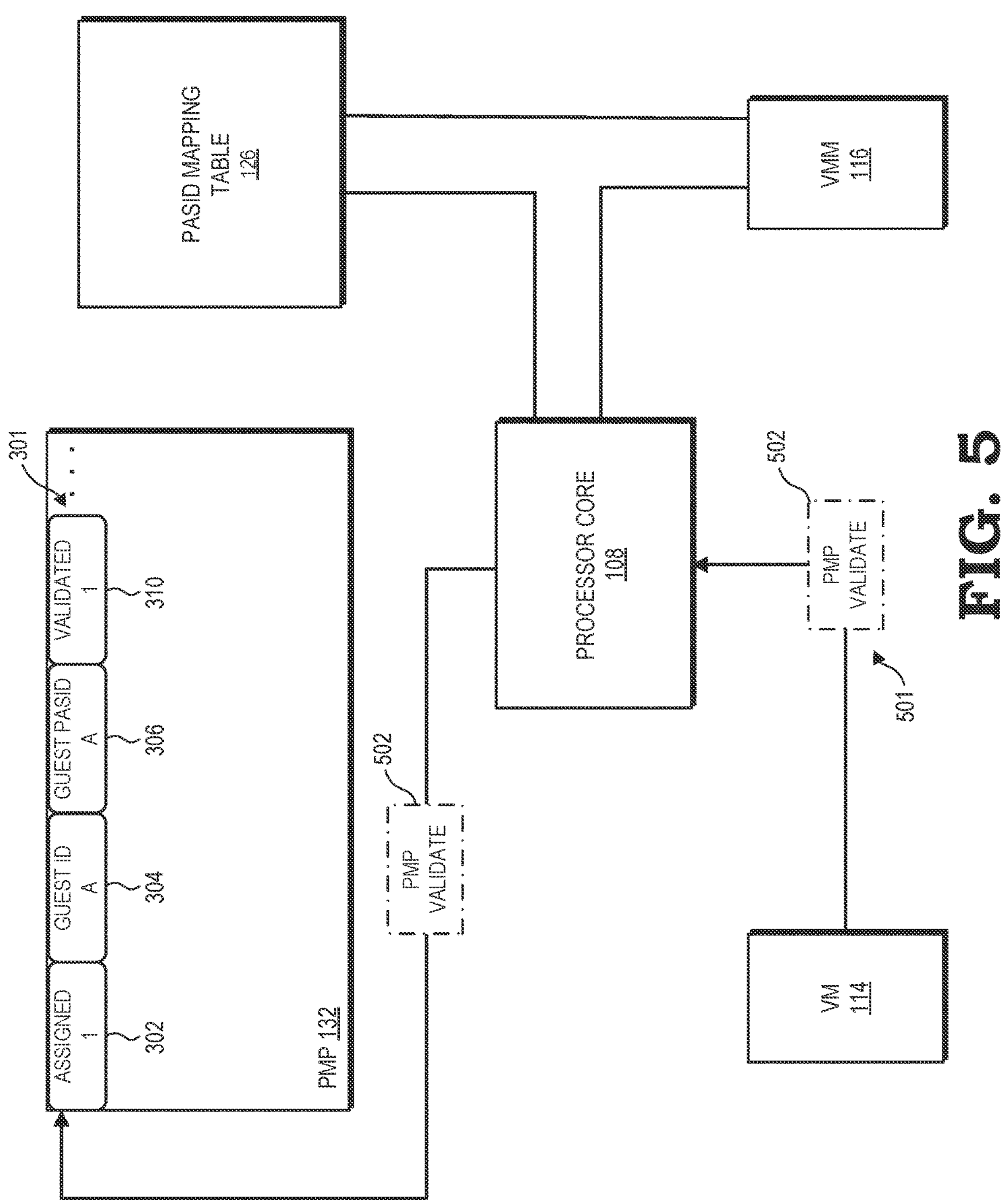
FIG. 5 is a block diagram illustrating an example of a virtual machine (VM) of the processing system of FIG. 1 performing a PMP validation process to validate the contents of an entry in the PMP of FIG. 3 for the host PASID associated with the guest PASID of the VM in accordance with some implementations.
Figure 6:
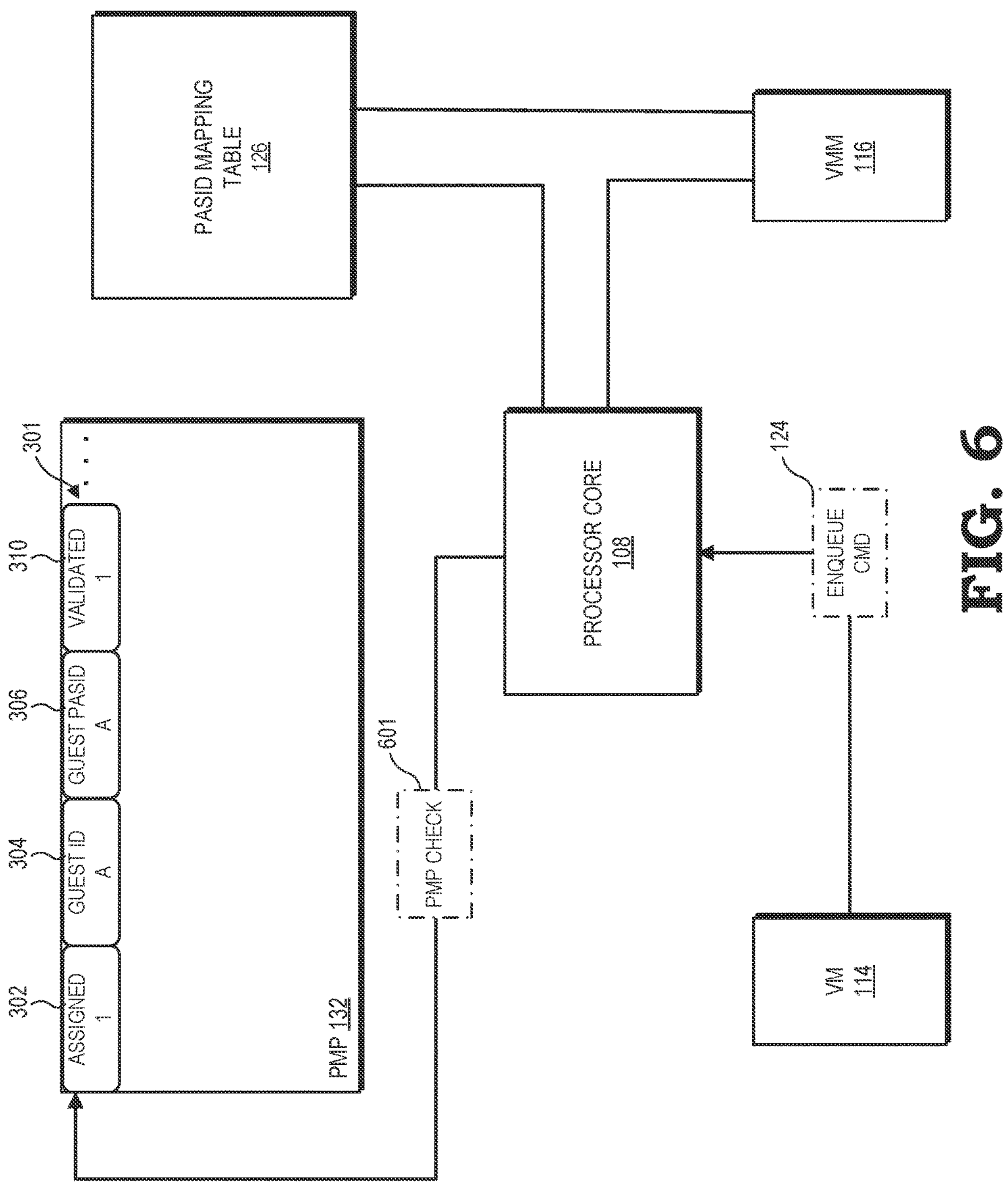
FIG. 6 is a block diagram illustrating an example of a processing core of the processing system of FIG. 1 performing a PMP check process responsive to receiving an enqueue command from a VM to ensure that the PMP includes the guest PASID and the guest identifier of the VM in accordance with some implementations.

FIG. 4 to FIG. 6 together illustrate an example of the processing system 100 performing secure management of PASID mapping using the PMP 132 to protect VMs 114 from unexpected changes to the PASID mapping in accordance with some implementations. In the illustrated example, a VMM 116 initially assigns a host PASID to a VM 114 and the VM 114 assigns a guest PASID to one or more of its processes. The VMM 116 sets the entries in the PASID mapping table(s) 126 using one or more techniques (e.g., memory writes) to map the guest PASIDs to host PASIDs. As shown in FIG. 4, the VMM 116 then invokes a PMP update process 401 to update an entry 301 in the PMP 132 for a particular host PASID. In at least some implementations, the VMM 116 performs the PMP update process 401 by sending an instruction 402, such as a PMPUPDATE instruction, to the processor core 108. The processor core 108 then executes the instruction 402 to update the entry 301 in the PMP 132. The instruction 402 includes information/parameters to update one or more fields of the entry 301. For example, the Assigned field 302 is updated to indicate that the associated host PASID has been assigned to a VM 114, the Guest ID field 304 is updated to include the guest ID of the VM 114 that owns the associated host PASID, and the Guest PASID field 306 is updated with the guest PASID that should translate to the associated host PASID. The PMP update process also clears/resets the bit stored in the Validated field 310, which indicates that the VMM 114 has changed the information maintained by that entry 301. For example, FIG. 4 shows that the Validated field 310 of the PMP entry 301 has a value of "0", which indicates that the contents of the entry 301 have been changed and have not been validated by a VM 114.

In at least some implementations, when a VM 114 intends to access a device interface 134 using a specified guest PASID, the VM 114 performs a PMP validation process 501 to validate the mapping of that guest PASID as illustrated in FIG. 5. For example, the VM 114 sends an instruction or request 502, such as a PMPVALIDATE instruction, to the processor core 108. The processor core 108 then executes the instruction 502. The instruction 502 includes one or more parameters, such as the guest PASID. The instruction 502 uses the PASID mapping tables 126 to translate the guest PASID to its host PASID. For example, referring to the mapping table configuration 200 of FIG. 2, the instruction 502 uses the PASID directory indicator in the first portion 204 of the guest PASID to identify a PASID directory pointer 210 from the memory data structure 212 associated with the VM 114. Then, the instruction 502 uses the second portion 206 of the guest PASID to identify a particular entry 216 in the associated PASID directory 214 for locating the corresponding PASID table 218. The instruction 502 uses the third portion 208 of the guest PASID to locate the entry in the PASID table 218 comprising the corresponding host PASID of the guest PASID. The host PASID is used by the instruction 502 as an index into the PMP 132 to identify the entry 301 associated with the host PASID. After the entry 301 in the PMP 132 has been identified, the instruction 502 checks one or more fields of the entry 301. For example, the instruction 502 checks the Assigned field 302 to determine if the host PASID has been assigned and also checks the Guest ID field 304 to determine if the VM 114 performing the PMP validation process 501 is assigned to the host PASID. If the host PASID has been assigned and is assigned to the VM 114 performing the PMP validation process 501, the instruction 502 sets the bit in the Validated field 310 of the entry 301 to indicate that the contents of the entry 301 have been explicitly verified by the VM 114. For example, FIG. 5 shows that the Validated field 310 of the PMP entry 301 has a value of "1", which indicates that the contents of the entry 301 have been validated by the VM 114.

When a process of the VM 114 wants to access the device interface 134 assigned to the VM 114, the process issues an enqueue command 124 to the processor core 108 as illustrated in FIG. 6. The enqueue command is generated by the process to place a work request in the SWQ of the device interface 134 as described above with respect to FIG. 1. The enqueue command 124 includes, for example, virtual addresses of all parameters, virtual address of a completion record, and the guest PASID of the VM process that is submitting the work to the device interface 134. In other embodiments, the enqueue command 124 obtains the guest PASID by reading an MSR programmed with the guest PASID. The processor core 108 receives the enqueue command 124 and, using the guest PASID included within the enqueue command 124, translates the guest PASID into its host PASID using the PASID mapping table(s) 126 similar to the translation process described above with respect to the PMP validation process 501.

Figure 7:
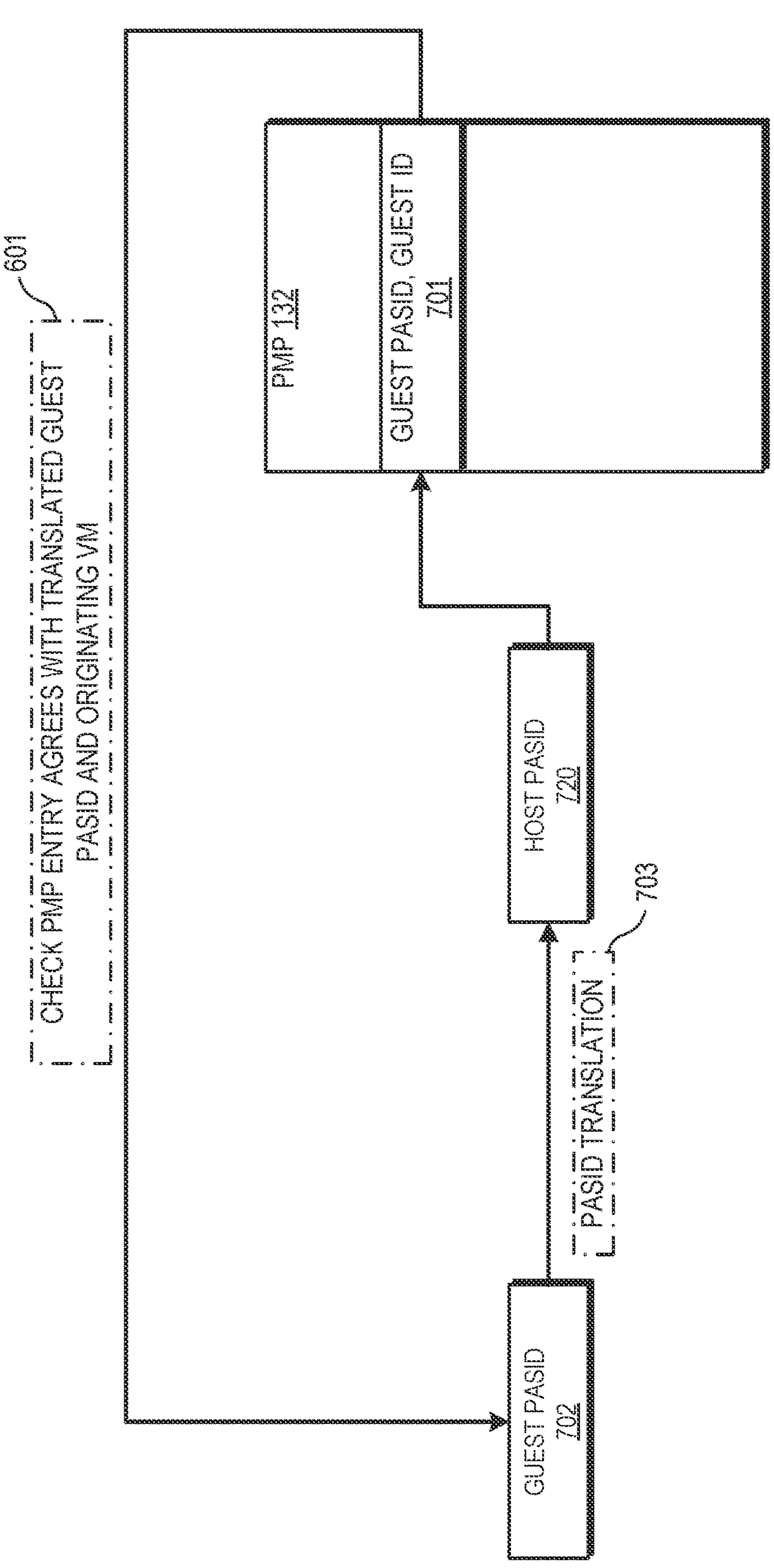
FIG. 7 is a block diagram illustrating a detailed view of the PMP check process of FIG. 6. in accordance with some implementations.

As part of executing the enqueue command 124, the processor core 108 performs a PMP check 601 on the PASID translation as illustrated in FIG. 7. For example, FIG. 7 shows that processor core 108 performs a translation process 703 to translate the guest PASID 702 included within the enqueue command 124 into its host PASID 720. The processor core 108 uses the host PASID 720 as an index into the PMP 132 to identify the PMP entry 701 corresponding to the host PASID 720. The processor core 108 then performs the PMP check 601 to determine if the entry 701 satisfies one or more conditions. For example, the processor core 108 determines if the Guest PASID field 306 of the entry 701 includes a guest PASID that matches the translated guest PASID 702 and the Guest ID field 304 of the entry 701 includes the identifier of the accessing VM 114 (i.e., the VM 114 that issued the enqueue command 124). This reverse mapping check ensures that the VMM 116 did not change the PASID mapping tables 126. In at least some implementations, the processor core 108 also checks if the Assigned field 302 indicates that the host PASID 720 has been assigned to a VM 114, the Validated field 310 indicates that the current contents of the entry 301 have been previously validated by the VM 114 associated with the enqueue command 124, or a combination thereof. If any of these conditions do not hold true, the PMP check fails and the processor core 108 determines that the VMM 116 has unexpectedly changed the PASID mapping after the VM 114 previously validated the contents of the entry 301. The enqueue command 124 will then exit the VM 114 and the VMM 116 is expected to recover by updating the PMP 132 using the PMP update instruction 402 described above. However, if the PMP check conditions hold true, the enqueue command 124 proceeds and the processor core 108 issues a DMWr 128 for placing a work request submitted by the process of the VM 114 into the SWQ of the device interface 134. As such, the PMP validation 501 and PMP check 601 processes ensure that the processes of the VM 114 do not act on unexpected or malicious PASID mappings.

Figure 8:
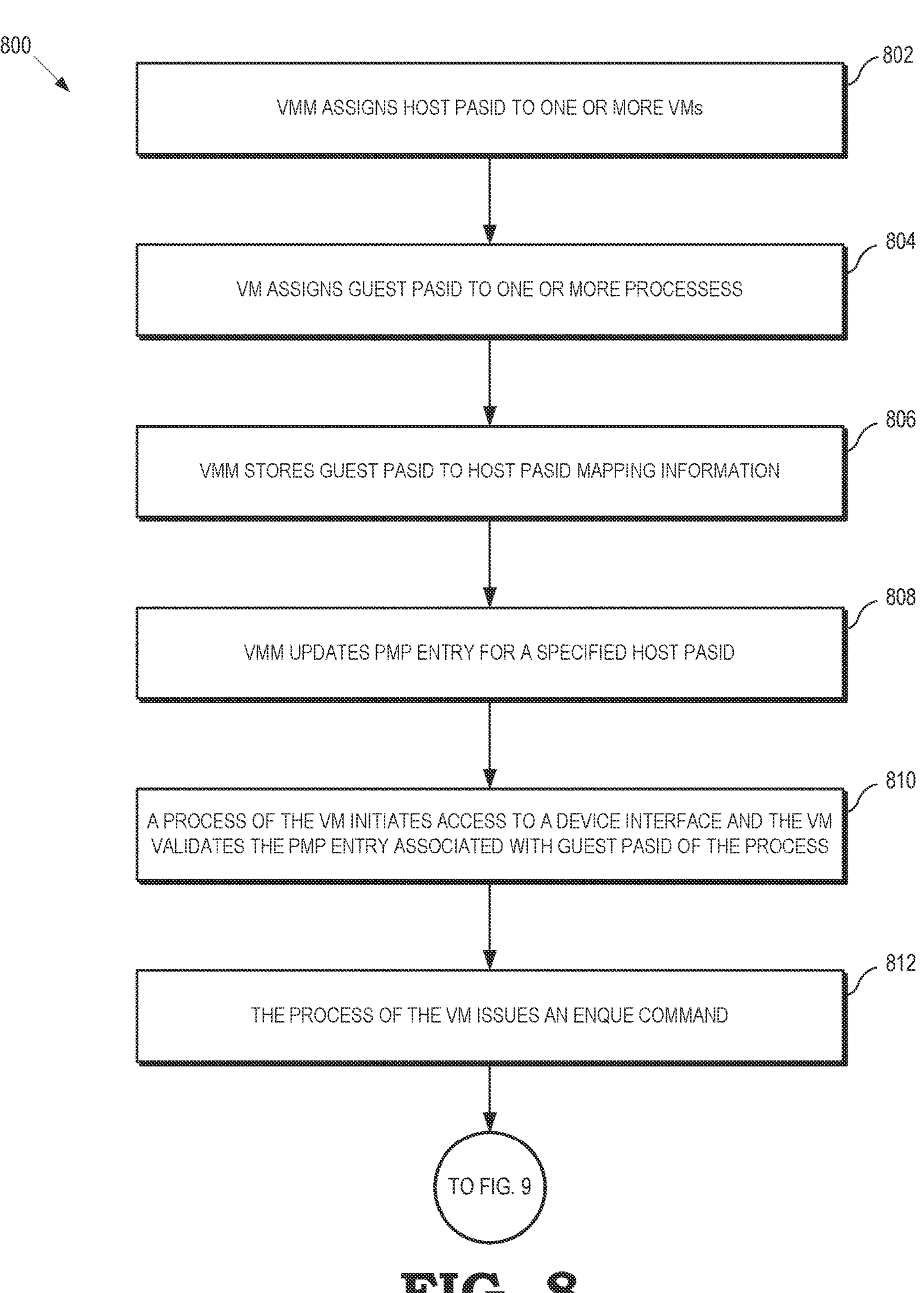
FIG. 8 and FIG. 9 are diagrams together illustrating an example method for secure management of PASID mapping in computing environments implementing virtualized input/output devices in accordance with some implementations.
Figure 9:
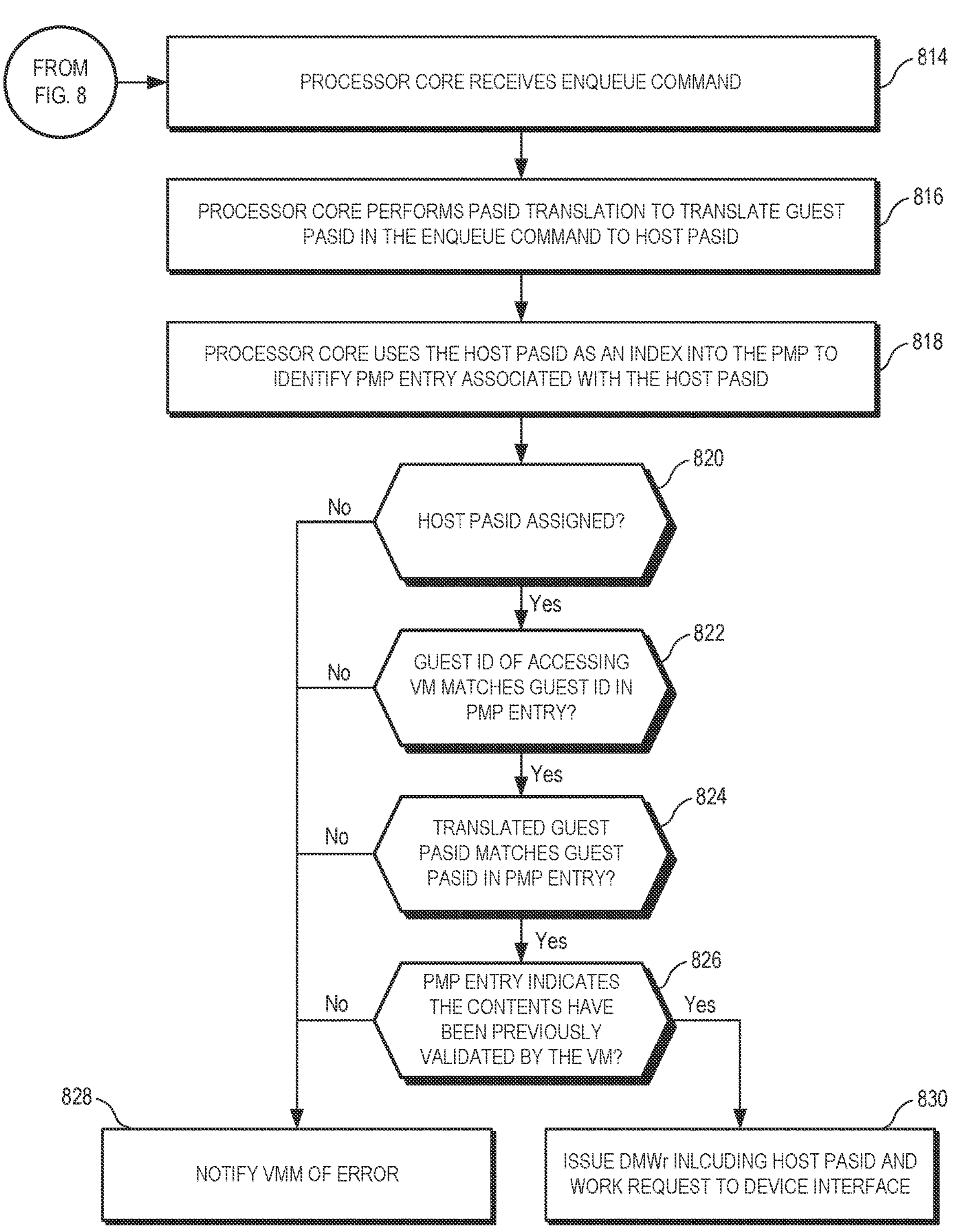

FIG. 8 and FIG. 9 together illustrate a flow diagram of a method 800 of securely managing PASID mapping in a confidential computing environment implementing input/output virtualization in accordance with some implementations. For purposes of description, the method 800 is described with respect to an example implementation at the processing system 100 of FIG. 1, but it will be appreciated that, in other implementations, the method 800 is implemented at processing systems having different configurations. At block 802, the VMM 116 initially assigns a host PASID to a VM 114. For example, the VMM 116 assigns a host PASID to a VM 114 from a global pool of available PASIDs. At block 804, the VM 114 assigns a guest PASID to one or more of its processes. At block 806, the VMM 116 stores guest PASID and host PASID mapping information. For example, the VMM 116 sets the entries in the PASID mapping table(s) 126 as described above with respect to FIG. 1. Maintaining the mapping of the PASIDs allows the VMM 116 to virtualize the PASIDs. That is, the VMM 116 transparently maps the PASIDs assigned by the VM 114 to real PASIDs to give the VM 114 the view that it owns the entire PASID space.

At block 808, the VMM 116 performs the PMP update process 401 described above with respect to FIG. 4 based on the mapping performed at block 506. For example, the VMM 116 executes a PMP update instruction 402 that updates the Assigned field 302, the Guest ID field 304, and the Guest PASID field 306. The PMP update instruction 402 also clears the validated bit in the Validated field 310. At block 810, a process of the VM 114 intends to access a device interface 134 using an assigned guest PASID and executes a PMP validate instruction (or request) 502. The PMP validate instruction 502 uses the PASID mapping tables 126 to translate the guest PASID to its host PASID as described above with respect to FIG. 5. The PMP validate instruction 502 uses the host PASID as an index into the PMP 132 to identify the entry 301 associated with the host PASID. After the entry 301 in the PMP 132 has been identified, the instruction 502 checks one or more fields of the entry 301. For example, the PMP validate instruction 502 confirms the entry indicates that the host PASID associated with the entry 301 has been assigned to the guest ID of the VM 114.

At block 812, the process issues an enqueue command 124 to access the device interface 134. For example, the enqueue command 124 attempts to place a work request in the SWQ of the device interface 134, as described above with respect to FIG. 1. At block 814, the processor core 108 receives the enqueue command 124. At block 816, the processor core 108 translates the guest PASID included in the enqueue command 124 to its host PASID as described above with respect to FIG. 6 and FIG. 7. The processor core 108 uses the host PASID as an index into the PMP 132 for performing a PMP check process 601 at blocks 818 to 826. For example, at block 818, the processor core 108 uses the host PASID as an index into the PMP 132 to identify the entry 301 corresponding to the host PASID. At block 820, the processor core 108 determines if the Assigned field 302 of the entry 301 indicates that the host PASID has been assigned to a VM 114. If the host PASID has not been assigned to a VM 114, the process flows to block 828 and the processor core 108 sends an error notification to the VMM 116. Stated differently, the processor core 108 prevents access to the device interface 134 by the VM 114. The VMM 116 is then expected to perform the PMP update process 401 to correct the error. Otherwise, the process flows to block 822 and the processor core 108 determines if the Guest ID of the VM 114 matches the Guest ID included in the Guest ID field 304 of the entry 301. If the Guest ID of the VM 114 does not match the Guest ID included the Guest ID field 304, the process flows to block 828 and the processor core 108 sends an error notification to the VMM 116. Otherwise, the process flows to block 824 and the processor core 108 determines if the translated guest PASID matches the guest PASID included in the Guest PASID field 306 of the entry 301. If the translated guest PASID does not match the guest PASID included in the Guest PASID field 306, the process flows to block 828 and the processor core 108 sends an error notification to the VMM 116. Otherwise, the process flows to block 826 and the processor core 108 determines if the current contents of the entry 301 have been previously validated by the VM 114. If contents of the entry 301 have not been previously validated, the processor core 108 determines that the VMM 116 has changed the contents of the entry 301 after the VM 114 performed the PMP validation process 501 at block 810. The process then flows to block 828 and the processor core 108 sends an error notification to the VMM 116. However, if the current contents of the entry 301 have been previously validated by the VM 114, the processor issues a DMWr 128 at block 830 to place the work request submitted by the process of the VM 114 into a SWQ of the device interface 134. The DMWr 128 includes information such as the host PASID identified based on the translation process and the work request submitted by the process. It should be understood that, in other implementations, the processor core 108 performs the PMP check 601 using a different arrangement of blocks 820 to 826.

In some implementations, certain aspects of the techniques described above may be implemented by one or more processors of a processing system executing software. The software includes one or more sets of executable instructions stored or otherwise tangibly embodied on a non-transitory computer readable storage medium. The software can include the instructions and certain data that, when executed by the one or more processors, manipulate the one or more processors to perform one or more aspects of the techniques described above. The non-transitory computer readable storage medium can include, for example, a magnetic or optical disk storage device, solid state storage devices such as Flash memory, a cache, random access memory (RAM) or other non-volatile memory device or devices, and the like. The executable instructions stored on the non-transitory computer readable storage medium may be in source code, assembly language code, object code, or other instruction format that is interpreted or otherwise executable by one or more processors.

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed. Also, the concepts have been described with reference to specific implementations However, one of ordinary skill in the art appreciates that various modifications and changes can be made without departing from the scope of the present disclosure as set forth in the claims below Accordingly, the specification and figures are to be regarded in an illustrative rather than a restrictive sense, and all such modifications are intended to be included within the scope of the present disclosure.

Benefits, other advantages, and solutions to problems have been described above with regard to specific implementations. However, the benefits, advantages, solutions to problems, and any feature(s) that may cause any benefit, advantage, or solution to occur or become more pronounced are not to be construed as a critical, required, or essential feature of any or all the claims. Moreover, the particular implementations disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular implementations disclosed above may be altered or modified and all such variations are considered within the scope of the disclosed subject matter. Accordingly, the protection sought herein is as set forth in the claims below.

What is claimed is:

1. A method comprising:

mapping, by a virtual machine manager, a guest process address space identifier (PASID) associated with a virtual machine (VM) to a host PASID associated with a host machine of the VM; and responsive to the mapping, maintaining, by a security module of a processor, an entry in a PASID reverse mapping table (PMP) indexed by the host PASID, the entry including one or more security attributes associated with the host PASID.

2. The method of claim 1, wherein maintaining the entry in the PMP comprises:

storing, as a security attribute of the one or more security attributes, the guest PASID in a field of the entry; and storing, as a second security attribute of the one or more security attributes, a guest identifier associated with the VM in a second field of the entry.

3. The method of claim 2, wherein maintaining the entry in the PMP comprises:

setting, as a third security attribute of the one or more security attributes, an indicator in a third field of the entry indicating that the VM has not validated the guest PASID and the guest identifier stored in the entry.

4. The method of claim 1, further comprising:

receiving a PMP validation instruction from the VM including a guest PASID;

translating the guest PASID included in the PMP validation instruction to a host PASID;

determining that the entry in the PMP corresponds to the host PASID associated with the translated guest PASID; and responsive to the one or more security attributes in the entry indicating that a guest PASID stored in the entry matches the translated guest PASID and a guest identifier stored in the entry corresponds to a guest identifier of the VM, setting an indicator in the entry indicating that the VM has validated the guest PASID and the guest identifier stored in the entry.

5. The method of claim 1, further comprising:

responsive to receiving a request from the VM to access a virtual device, translating a guest PASID included in the request to a host PASID;

identifying the entry in the PMP based on the host PASID associated with the translated guest PASID; and responsive to the one or more security attributes satisfying at least one specified condition, allowing the access to the virtual device by the VM.

6. The method of claim 5, wherein the at least one specified condition includes a guest PASID stored in the entry matching the translated guest PASID and a guest identifier stored in the entry matching a guest identifier of the VM.

7. The method of claim 6, wherein the at least one specified condition further includes an indication that the VM has previously validated the guest PASID and the guest identifier stored in the entry.

8. The method of claim 1, further comprising:

responsive to receiving a request from the VM to access a virtual device, translating a guest PASID included in the request to a host PASID;

identifying an entry in the PMP based on the host PASID associated with the translated guest PASID; and preventing the access to the virtual device responsive to at least one of:

a guest PASID stored in the identified entry and a guest identifier stored in the identified entry failing to match the translated guest PASID and a guest identifier of the VM, or the identified entry including an indication that the VM has not previously validated the guest PASID and the guest identifier stored in the identified entry.

9. A method comprising:

in response to receiving, from a virtual machine (VM) device, a request to access a virtual device, translating a guest process address space identifier (PASID) of the VM to a host PASID associated with a host machine; and preventing the access to the virtual device responsive to identifying that an entry in a PASID reverse mapping table (PMP) indexed by the host PASID fails to satisfy one or more conditions.

10. The method of claim 9, wherein the preventing of the access comprises at least one of:

determining that a guest PASID stored in the entry fails to match the translated guest PASID; or determining a guest identifier stored in the entry fails to match a guest identifier of the VM.

11. The method of claim 9, wherein the preventing of the access comprises determining that the entry comprises an indication that the VM has not validated at least one of a guest PASID stored in the entry and a guest identifier stored in the entry.

12. The method of claim 9, further comprising allowing the access of the virtual device responsive to:

determining that a guest PASID stored in the entry matches the translated guest PASID; and determining a guest identifier stored in the entry matches a guest identifier of the VM.

13. The method of claim 9, further comprising allowing the access of the virtual device responsive to determining that the entry comprises an indication that the VM has validated at least one of a guest PASID stored in the entry and a guest identifier stored in the entry.

14. A processor comprising:

an executable virtual machine manager (VMM) configured to map a guest process address space identifier (PASID) associated with a virtual machine (VM) to a host PASID associated with a host machine of the VM; and a processor core configured to maintain, responsive to the guest PASID being mapped to the host PASID, an entry in a PASID reverse mapping table (PMP) indexed by the host PASID, the entry including one or more security attributes associated with the host PASID.

15. The processor of claim 14, wherein the processor core is configured to maintain the entry in the PMP by:

storing, as a security attribute of the one or more security attributes, the guest PASID in a field of the entry; and storing, as a second security attribute of the one or more security attributes, a guest identifier associated with the VM in a second field of the entry.

16. The processor of claim 15, wherein the processor core is configured to maintain the entry in the PMP by:

setting, as a third security attribute of the one or more security attributes, an indicator in a third field of the entry indicating that the VM has not validated the guest PASID and the guest identifier stored in the entry.

17. The processor of claim 14, wherein the processor core is further configured to:

receive a PMP validation instruction from the VM including a guest PASID;

translate the guest PASID included in the PMP validation instruction to a host PASID;

determine that the entry in the PMP corresponds to the host PASID associated with the translated guest PASID; and responsive to the one or more security attributes in the entry indicating that a guest PASID stored in the entry matches the translated guest PASID and a guest identifier stored in the entry corresponds to a guest identifier of the VM, set an indicator in the entry indicating that the VM has validated the guest PASID and the guest identifier stored in the entry.

18. The processor of claim 14, wherein the processor core is further configured to:

responsive to a request being received from the VM to access a virtual device, translate a guest PASID included in the request to a host PASID;

identify the entry in the PMP based on the host PASID associated with the translated guest PASID; and responsive to the one or more security attributes satisfying at least one specified condition, allowing the access to the virtual device by the VM.

19. The processor of claim 18, wherein the at least one specified condition includes at least one of:

a guest PASID stored in the entry matching the translated guest PASID and a guest identifier stored in the entry matching a guest identifier of the VM; or an indication that the VM has previously validated the guest PASID and the guest identifier stored in the entry.

20. The processor of claim 14, wherein the processor is further configured to:

responsive to a request being received from the VM to access a virtual device, translate a guest PASID included in the request to a host PASID;

identify an entry in the PMP based on the host PASID associated with the translated guest PASID; and prevent the access to the virtual device responsive to at least one of:

a guest PASID stored in the identified entry and a guest identifier stored in the identified entry failing to match the translated guest PASID and a guest identifier of the VM, or the identified entry including an indication that the VM has not previously validated the guest PASID and the guest identifier stored in the identified entry.

* * * * *